United States Patent [19]

Paul et al.

[11] Patent Number: 5,427,195
[45] Date of Patent: Jun. 27, 1995

[54] HYDRAULIC DRIVE AND STEERING SYSTEMS FOR A VEHICLE

[75] Inventors: Lowell A. Paul, Abbotsford; Lyle C. Cazes, Clearbrook, both of Canada

[73] Assignee: Int. Silvatech Ltd., Clearbrook, Canada

[21] Appl. No.: 237,910

[22] Filed: May 4, 1994

[51] Int. Cl.6 .......................................... B60K 17/356
[52] U.S. Cl. ................................. 180/308; 180/242; 60/466
[58] Field of Search ............... 180/305, 306, 307, 308, 180/242, 248; 60/421, 466

[56] References Cited

U.S. PATENT DOCUMENTS

| | | | |
|---|---|---|---|
| 3,414,072 | 12/1968 | Hodges, Jr. et al. | 180/51 |
| 3,900,075 | 8/1975 | Chichester et al. | 180/6.3 |
| 3,910,369 | 10/1975 | Chichester et al. | 180/44 |
| 3,916,625 | 11/1975 | Holtkamp | 60/421 |
| 3,981,374 | 9/1976 | Johns, Jr. | 180/14 |
| 4,042,053 | 8/1977 | Sieren et al. | 180/51 |
| 4,140,196 | 2/1979 | Brewer | 180/44 |
| 4,244,184 | 1/1981 | Baldauf et al. | 180/308 X |
| 4,557,346 | 12/1985 | Guignard et al. | 180/242 |
| 4,570,741 | 2/1986 | McCoy | 180/308 X |
| 4,773,219 | 9/1988 | Bagwell | 180/308 X |
| 5,020,627 | 6/1991 | Wittke | 180/234 |
| 5,199,525 | 4/1993 | Schueller | 180/242 |

FOREIGN PATENT DOCUMENTS 148654 11/1980 Japan ................................. 180/308

Primary Examiner—Margaret A. Focarino
Assistant Examiner—Kevin Hurley
Attorney, Agent, or Firm—Bull, Housser & Tupper

[57] ABSTRACT

Front and rear wheeled units of vehicle are connected together for articulated steering. Wheels on at least one unit are mounted for swivelling relative to the respective unit to provide kingpin steering in combination with articulation steering. A first embodiment has front and rear kingpin steering and articulation steering performed manually and independently of the each other. In a second embodiment, a steering integrator cooperates with actuators which control at least the articulation steering and kingpin steering of the front wheels to automatically integrate two types of steering so that a controlled relationship exists between an articulation angle of the front unit with respect to the rear unit, and swivel angles of the front wheels with respect to the front unit. A manual steering control, e.g. a steering wheel, controls actuation of the steering integrator. Each wheel is powered by a hydraulic motor receiving pressurized fluid from a drive apparatus comprising a flow combiner and two flow restrictors connected in parallel with each other and communicating with outlets from the wheel motors. Isolating valves can be used to isolate the flow combiner and flow restrictors as needed in certain applications not requiring the flow combiner, to reduce generation of heat in the hydraulic fluid.

9 Claims, 7 Drawing Sheets

HYDRAULIC DRIVE AND STEERING SYSTEMS FOR A VEHICLE

BACKGROUND OF THE INVENTION

The invention relates to a hydraulic drive apparatus and combination steering system for an industrial vehicle, in particular a four-wheel drive tractor as used in rough terrain.

Hydraulic drive systems for tractors have been used for many years, particularly four-wheel hydrostatic drive systems which have particular applications in terrain where there is poor traction, for example in agricultural, forestry, construction and mining applications. It is common for such vehicles to have hydraulic motors provided in the wheels, the motors being supplied with pressurized hydraulic fluid from a control system designed to reduce wheel slippage in poor traction conditions. It is known to provide the two motors of an oppositely disposed pair of wheels to receive pressurized hydraulic fluid from a variable displacement pump, the pump transmitting fluid to the wheel motors disposed in parallel. A flow divider is commonly fitted upstream of the wheel motors of the pair i.e. before motor inlets when driven forwardly, to ensure that the fluid flow is divided essentially equally between the wheels. In this way, should a wheel of the pair lose traction and slip, thus tending to rotate at a higher speed than the wheel maintaining traction, the flow divider ensures that the slipping wheel does not receive much more fluid than the wheel maintaining traction. Thus, power is still applied to the wheel maintaining traction and increases the chance of the vehicle being able to proceed. However, if the vehicle descends a slope in the forward drive mode, and the motors are used to brake the vehicle, if a flow divider is located upstream of inlets of the motor, low pressure can be generated at the inlet of at least one motor, and this can cause severe damage to the motor due to cavitation. Chances of cavitation occurring can be reduced by use of anti-cavitation valves.

When such a vehicle is operated in reverse, the flow divider is now located downstream from the wheel motors, and thus operates as a flow combiner and thus attempts, in a similar manner, to ensure that both wheels transmit essentially equal volume flows of fluid.

It is well known that use of a flow divider/combiner dissipates energy, and consequently heats the hydraulic fluid. If a vehicle is working continuously, and the flow divider/combiner is operating continuously, continuous pressure loss generates considerable heat which requires an adequate heat sink, typically an air-cooled hydraulic fluid or oil cooler. In some circumstances, the capacity of the cooler is insufficient and damage can result to the equipment from running on over-heated hydraulic fluid.

There are many patents relating to hydrostatic vehicle propulsions systems, typical patents being as follows: U.S. Pat. No. 3,900,075 (Chichester et al); U.S. Pat. No. 3,910,369 (Chichester et al); U.S. Pat. No. 3,916,625 (Holtkamp) U.S. Pat. No. 4,244,184 (Baldauf et al) and U.S. Pat. No. 5,199,525 (Schueler).

Also, when a hydrostatic drive vehicle negotiates a turn, to avoid wheel scuffing, wheels on the outside of the turn rotate faster than wheels on the inside of the turn, and thus the motor for the outside wheel requires a greater flow of fluid therethrough than the motor for the inside wheel. The difference in fluid flow rates between inside and outside wheels of a turn, hereinafter termed "flow differential", presents problems if a flow divider is provided in the inlet circuit, which attempts to maintain a constant flow through the wheels irrespective of the turn. Various devices have been devised to accommodate these problems and some of these devices are relatively complex and still result in scuffing of wheels during a tight turn.

For example, the above U.S. Pat. Nos. 3,900,075 and 3,910,369 disclose use of a proportional flow divider controlling flow to a pair of wheels, in which the flow divider proportions or distributes flow between the wheels in proportion to angle of the turn but, as discussed above, continuous use of a flow divider can generate excessive heat. Furthermore, accuracy of flow proportions of some proportional dividers/combiners is fairly poor, and thus the flow divider often can proportion flow improperly, causing excessive wheel scuffing during turning.

There are two main ways of steering such vehicles, namely modified Ackerman or kingpin steering, as used on most road vehicles, or articulated steering, which is commonly used in rough terrain vehicles, e.g. industrial tractors, which, in the logging industry, are termed "skidders". In modified Ackerman steering, the front wheels swivel about respective, generally vertical kingpins or equivalents which support generally horizontal stub axes which journal the wheels. When negotiating a turn, the front wheels follow an arc, and the back wheels tend to trail after the front wheels, on an inside of the turn and generally following a chord of the arc of the front wheels. Thus, when operating the vehicle in confined spaces, the rear wheels tend to trail the front wheels and require additional space on the inside of the turn.

The problem of trailing rear wheels is overcome by articulated steering, in which the vehicle has front and rear units connected together for articulated steering about a generally vertical articulation axis. Each unit has at least one pair of laterally spaced wheels, which are commonly mounted on fixed beam axles with respect to the units, so that the wheels can rotate about horizontal axes with respect to each unit, but do not rotate about vertical axes. Such vehicles are rugged and relatively successful in some applications, but have limitations in other applications on sensitive terrain. One problem is that, as the vehicle negotiates a turn, the front and rear units are articulated or inclined relative to each other at an angle, and the front and rear wheel pairs execute essentially identical arcs centred on a turn centre. In a normal turn, with no slippage, the rear wheels can follow essentially exactly in the paths of the front wheels, and this can damage delicate or sensitive terrain, particularly if the wheels start to slip due to poor traction. U.S. Pat. No. 3,414,072 (Hodges Jr. et al) and U.S. Pat. No. 3,910,369 (Chichester) disclose such vehicles.

In contrast, U.S. Pat. No. 4,042,053 (Sieren et al) discloses a four-wheel drive tractor with articulated steering between front and rear units, but with the front wheels also mounted for kingpin steering. This patent discloses a mechanical, as opposed to a hydraulic, tractor which has direct, mechanically powered wheels and steering units, and uses transmission shafts and gears as opposed to hydraulically powered motors etc. and which is therefor relatively complex. This patent shows a vehicle with a combination of front wheel kingpin steering and articulation steering which has several advantages. One of the advantages recognized by the patentee is that for a given radius of turn, the front wheels are inclined to the front unit and the rear unit is inclined to the front unit at shallower angles (i.e. less acute angles) than otherwise would be required for a normal kingpin steering or normal articulation steering vehicle. Use of shallower angles improves efficiency of power transfer to the wheels, as well as tractive effort for any load pulled by the tractor. In addition, because the units operate at shallower angles to each other than normal, any mechanical transmission components are operating in improved alignment with each other, which reduces wear and power consumption, thus improving life of the vehicle.

SUMMARY OF THE INVENTION

The invention provides a vehicle hydraulic drive system in which cooling loads of a hydrostatic drive system are reduced considerably when the hydrostatic drive is not required, as is found in some applications. The circuit of the drive system also prevents inlets of the hydraulic motors being exposed to low pressure when the vehicle descends forwardly and the motors are used to brake the vehicle. In addition, wheel scuffing during a tight turn is reduced considerably by providing a simple and effective means to accommodate the flow differential between the inside and outside wheels of the turn, without incurring high heat generation.

Also, the invention provides a steering apparatus of greater versatility than the prior art by providing three modes of steering for the vehicle, namely: articulation steering between front and rear units, and kingpin steering for wheels mounted on the front unit, and also on the rear unit. The invention permits conventional operation of the kingpin steering for the front wheels, with or without individual or independent control of the articulation steering, and of the rear wheel kingpin steering, which provides considerable versatility, but requires good operator skills for some types of manoeuvres. Alternatively, the invention also provides a structure for automatically combining or integrating at least two modes of steering, for example the front kingpin steering and the articulation steering, thus simplifying operation of the vehicle for novice operators, with a slight loss of versatility.

A vehicle hydraulic drive apparatus according to the invention comprises a pressurized hydraulic fluid source, at least one pair of right hand and left hand wheel motors, right hand and left hand isolating valves, right hand and left hand flow restrictors, and a flow combiner. The hydraulic fluid source has a discharge which discharges pressurized fluid under a relatively high pressure, and a return which scavenges fluid under a relatively low pressure. The right hand and left hand wheel motors have respective fluid inlets and fluid outlets, each inlet communicating with the discharge of the fluid source when the vehicle is driven forwardly. The right hand and left hand isolating valves communicate with the outlet of the respective motor and the return of the pressurized hydraulic fluid source when the vehicle is driven forwardly. The right hand and left hand flow restrictors communicate with the outlet from the respective motor, and the return of the pressurized fluid source when the vehicle is driven forwardly. The flow combiner has right hand and left hand inlets communicating with the outlets from the right hand and left hand wheel motors respectively, and an outlet communicating with the return of the fluid source when the vehicle is driven forwardly. Preferably, the flow restrictors are in parallel with the flow combiner and the isolating valves are in parallel with the flow combiner and flow restrictors.

Another aspect of the invention provides a wheeled vehicle comprising front and rear units, an articulation steering actuator, front and rear kingpin steering actuators, and steering controls. The front and rear units have right hand and left hand wheels as a pair, units being connected together to permit relative rotation therebetween about a generally vertical articulation axis. Each wheel is mounted on its respective unit for kingpin steering to permit rotation of each respective wheel about a respective generally vertical swivel axis relative to the respective unit. The articulation steering actuator cooperates with the front and rear units to cause the said relative rotation to effect articulation steering as required. The front and rear kingpin steering actuators cooperate with each pair of front and rear wheels respectively to cause the rotation about the respective swivel axes to effect the kingpin steering between the wheels of the respective units as required. The steering controls control actuation of the articulation actuator between the front and rear units, and control actuation of the kingpin steering actuator with respect to at least one or both of the units. The front kingpin steering control and rear kingpin steering control are operable independently of each other. The articulation steering control is operable independently of the control for controlling actuation of the kingpin steering actuator with respect to at least one or both of the units.

Another embodiment of the invention is a wheeled vehicle comprising front and rear units, an articulation steering actuator, a front kingpin steering actuator, a steering integrator and a manual steering control. The front and rear units have right hand and left hand wheels as a pair, the units being connected together to permit relative rotation therebetween about a generally vertical articulation axis. The front wheels are mounted on the front unit for kingpin steering to permit rotation of each front wheel about a respective generally vertical swivel axis relative to the front unit. The articulation steering actuator cooperates with the front and rear units to cause the said relative rotation to effect articulation steering as required. The front kingpin steering actuator cooperates with the front wheels to cause the rotation about the swivel axes to effect the said kingpin steering between the wheels of the front unit as required. The steering integrator cooperates with the articulation steering actuator and the kingpin steering actuator to automatically integrate articulation steering between the front and rear units and kingpin steering of the front wheels. In this way, a controlled relationship exists between an articulation angle of the front unit with respect to the rear unit, and swivel angles of the front wheels with respect to the front unit. A manual steering control controls actuation of the steering integrator which in turn controls an articulation angle between the front and rear units and respective swivel angles of the right hand and left hand front wheels with respect to the front unit.

Preferably, the steering integrator comprises primary and secondary steering signal apparatus. The primary steering signal apparatus is responsive to the manual steering control and has a primary signal output. The secondary steering signal apparatus has an input connectable to the output of the primary steering signal apparatus and first and second outputs. The first output is transmitted to the articulation steering actuator, and the second output is transmitted to the front kingpin steering actuator. The first and second outputs have an output signal ratio which reflects the controlled proportional relationship between the angle of the front units with respect to the rear unit and the swivel angles of the front wheels with respect to the front unit.

Preferably, each front wheel has a steering assembly which includes respective front tie rod arm extending therefrom and a tie rod assembly connecting together the tie rod arms. The tie rod assembly includes a tie rod shortening structure for shortening effective length of the tie rod assembly as the wheels are swivelled from straight line alignment. Preferably, the shortening structure of the tie rod assembly includes right hand and left hand tie rod portions and a steering bellcrank. Each tie rod portion has respective outer and inner ends, the outer ends of the right hand and left hand tie rod portions being connected to the tie rod arm of the right hand and left hand wheel assemblies respectively. The steering bellcrank interconnects inner ends of the right hand and left hand tie rod portions, and is journalled for rotation in response to movement of the wheels so that as the swivel angle of the front wheel with respect to the front unit increases, effect length of the tie rod decreases.

A detailed disclosure following, related to drawings, describes two embodiments of the apparatus according to the invention, which is capable of expression in structure other than that particularly described and illustrated.

DETAILED DESCRIPTION

Figure 1:
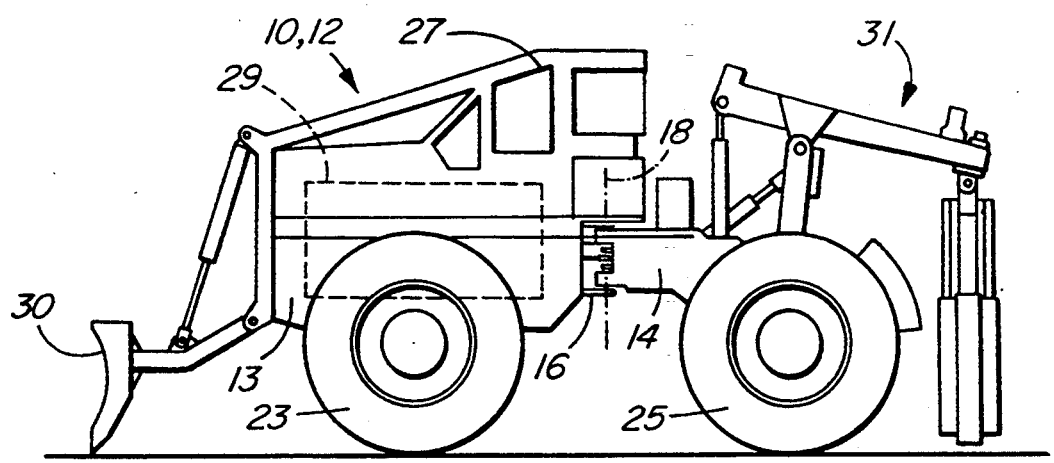
FIG. 1 is a simplified side elevation of a typical vehicle fitted with a hydraulic drive system and combination steering system according to the invention.
Figure 2:
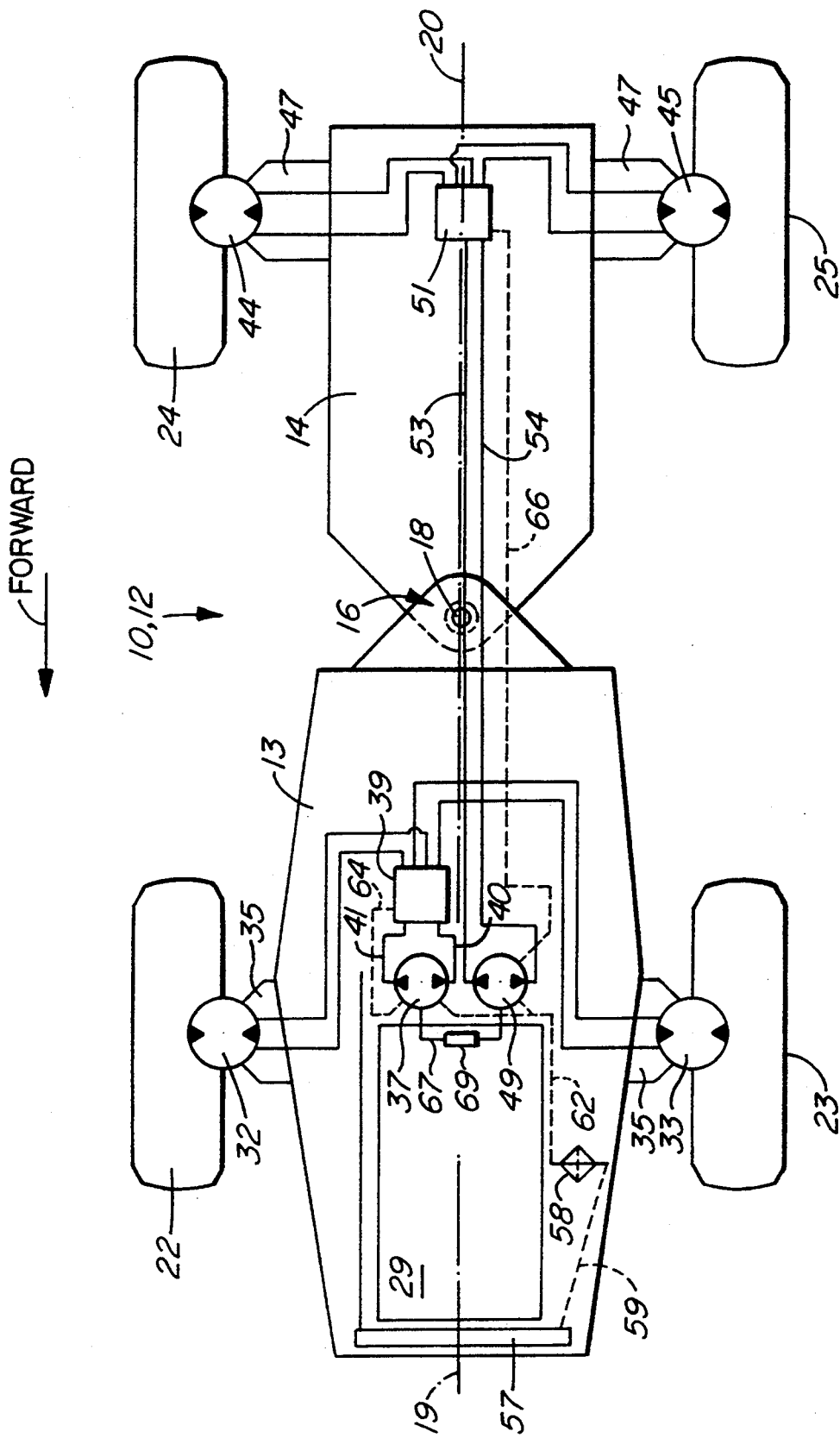
FIG. 2 is a simplified schematic of the vehicle of FIG. 1 showing main components of the hydraulic drive system for powering wheels of the vehicle, including connections to two control or logic blocks.

FIGS. 1 and 2

A vehicle 10 according to the invention has a body 12 which comprises front and rear units 13 and 14, the units being connected together at an articulation joint 16 to permit relative rotation therebetween about a generally vertical articulation axis 18. The units 13 and 14 have respective longitudinal unit axes 19 and 20 which intersect at the articulation axis 18 as shown. The front unit has right and left hand front wheels 22 and 23 disposed as a front pair, and the rear unit has right hand and left hand rear wheels 24 and 25 disposed as a rear pair, the pairs having similar track widths so that transverse spacings between the wheels of each pair are equal. The front unit has an operator cab 27, an engine 29 and a typical tool, e.g. an earth moving blade 30, as commonly used in site clearing or reclamation operations. The rear unit also has a typical tool, e.g. hinged boom 31 carrying a grapple, as used for handling trees. Clearly, many other different types of tools could be substituted and fitted to the front and rear units, and alternative locations of the operator cab and engine are contemplated. For many applications, but particularly for site reclamation and silviculture, the vehicle preferably has a high ground clearance, particularly adjacent the articulation joint 16 to permit the vehicle to clear stumps, rocks and other debris on a reclaimed site.

Referring specifically to FIG. 2, the right hand and left hand front wheels 22 and 23 of the front unit are powered by right hand and left hand front wheel motors 32 and 33. The motors are reversible, piston-type hydraulic motors having an operating pressure range of between 0 and 4800 psi, a suitable motor being manufactured by Reidville Hydraulic and Mfg., Inc., a corporation of Connecticut, U.S.A. The motors are integrated into the wheels, and are mounted on a front axle beam 35, the front axle beam carrying kingpin steering units for the wheels as will be described with reference to FIG. 4. A front hydraulic pump 37 is connected through main conduits 40 and 41 to a front control or logic block 39 which connects the motors 32 and 33 by a hydraulic circuit which powers the motors and is described in greater detail with reference to FIG. 3. The front hydraulic pump 37 is a variable displacement, variable speed, piston pump having an output pressure within a range of between 600 and 5000 psi, a suitable pump being manufactured by Denison Hydraulics, Inc., a corporation of Ohio, U.S.A.

Similarly, the rear unit 14 has right and left hand rear wheel motors 44 and 45 driving the right hand and left hand rear wheels 24 and 25, the motors being similarly mounted on a rear axle beam 47. As will be described with reference to FIG. 4, the rear wheels are similarly provided with kingpin steering, and thus the vehicle has four-wheel kingpin steering and articulation steering, which provides three separate modes of steering. The front unit also carries a rear hydraulic pump 49 which supplies fluid to, and receives fluid from, a rear control or logic block 51 through main conduits 53 and 54 which is mounted on the rear unit, and which, in turn, supplies fluid to the motors 44 and 45 similarly to that front control block. The front and rear logic blocks 39 and 51 are essentially identical, and thus one only will be described with reference to FIG. 3.

The vehicle includes an oil cooler 57 and an oil filter 58 interconnected by a first cooler conduit 59. A second cooler conduit 62 extends between the oil filter and is bifurcated to interconnect with the front and rear pumps 37 and 49. A front cooler conduit 64 and a rear cooler conduit 66 interconnect the front and rear logic blocks 39 and 51 with the front and rear pumps 37 and 49 respectively and in turn connect with the conduit 62. The cooler conduits carry heated fluid from the logic blocks to the pump casings through which the fluid flows prior to passing through the oil cooler 57 for cooling as is well known. Preferably, a pump interconnecting conduit 67 extends between the front and rear pumps 37 and 49 and has a variable restrictor 69 to control any fluid exchange between the pumps. The conduit 67 and restrictor 69 are particularly applicable where the vehicle spends a lot of time in tight manoeuvring situations, or where there is a wide variation of speed between front and rear wheel pairs. In other applications where the vehicle spends a lot of time on straight driving, the conduit 67 and restrictor 69 can be omitted. The apparatus also includes many other known components which are conventionally found in hydrostatic vehicle drive units and are which not illustrated herein in any of the figures. Such components include variable speed devices, direction reversing devices, fluid return lines, etc.

FIG. 3

The front logic block 39 is a hydraulic circuit and its relationship to other main components will be described, the front logic block being shown within a rectangular broken outline, which corresponds to the outline shown in FIG. 2.

The pump 37 serves as a pressurized hydraulic fluid source having a discharge 81 which discharges pressurized fluid under a relatively high pressure in the conduit 40 to the block 39, and a return 83 which scavenges fluid from the circuit under a relatively low pressure in the conduit 41. Fluid from the pump is "processed" or controlled by the control or logic block 39 which supplies fluid to, and returns fluid from, at least one pair of right hand and left hand wheel motors 32 and 33 as shown.

In the following description, it is assumed that the vehicle is driven forwardly and thus the pump 37 is driven in a forward direction, so that fluid flows out of the discharge 81 in direction of an arrow 85 into the logic block. The motor 32 has a fluid inlet and outlet 88 and 89 respectively, and the motor 33 has a similar fluid inlet and outlet 90 and 91 respectively. The fluid inlets 88 and 90 receive fluid from conduits 94 and 95 respectively, which serve as inlet conduits extending from the logic block 39. The outlets 89 and 91 discharge fluid into outlet conduits 98 and 99 respectively which in turn pass into the logic block.

The logic block has several components which function together to control ratio of fluid flow volumes through the motors, when required, and, when needed, to send a controlled flow of hydraulic fluid to the cooler 57, (FIG. 2) as will be described. A main component of the logic block is a flow combiner/divider unit 102 which operates as a flow combiner when the vehicle operates in a forward mode, and as a flow divider when the vehicle is in a reverse mode. When the unit 102 is functioning as a flow combiner, it has right hand and left hand inlets 104 and 105 communicating with the conduits 98 and 99, and thus also with the outlets 89 and 91 from the right hand and left hand wheel motors respectively. The flow combiner has an outlet 108 communicating with the main conduit 41, that is with the return 83 of the pressurized fluid source. When the vehicle is driven forwardly, the flow combiner unites or combines outlet flows downstream from the motors in essentially equal proportions, i.e. in such a way that ratio of outlet flow from one motor to outlet flow from another motor is within a closely controlled ratio limit, e.g. about 5 per cent—6 per cent, as is well known. Also as is well known, when the vehicle operates in reverse mode, the flow combiner 102 functions as a flow divider, and thus proportions fluid flow upstream from the motors so that fluid flows essentially equally into the outlet ports 89 and 91 of the motor 32 and 33, which ports now serve as inlet ports.

The logic block 39 also includes a pair of right hand and left hand flow restrictors or orifices 110 and 111, which are restricting orifices in conduits extending between the outlet conduits 98 and 99, and the main conduit 41. It can be seen that the flow restrictors 110 and 111 are essentially in parallel with the flow combiner/divider 102, and thus communicate with the outlets 89 and 91 in the respective motor and the return 83 of the pressurized fluid source. The flow restrictors 110 and 111 have metering bores of equal sizes which are selected to ensure that a speed differential can exist between the front wheels when the vehicle is negotiating a turn to essentially prevent scuffing of the wheels, as will be described. As is well known, when a vehicle negotiates a turn, the outside wheel rotates faster than the inside wheel, consequently the outside wheel hydraulic motor passes a greater volume of fluid than the inside wheel motor in proportion to radius of the turn, "track" size or transverse width between the wheels of the pair and other factors, and is defined herein "flow differential". The flow restrictors 110 and 111 have a size sufficient to enable this flow differential to exist between the wheels describing a turn of minimum radius with negligible scuffing. It has been found that ratio of maximum flow through one flow restrictor to maximum flow through the flow combiner is about 1:10 and this provides a sufficient flow differential for many applications. This flow differential would be very much less if the flow combiner 102 was used by itself i.e. without the flow restrictors, because a flow combiner ensures that flow from the wheels is held within much smaller tightly controlled limits and this would cause scuffing while turning.

The logic block 39 further includes right hand and left hand isolating valves 114 and 115 which communicate with the motor outlets 89 and 91 through valve conduits 118 and 119 respectively. The conduits 118 and 119 extend from the valves to a common conduit 122 which in turn connects with the main conduit 41 to communicate with the return 83 of the pressurized fluid source. The isolating valves 114 and 115 are two-way, two-position, normally-closed solenoid valves which are connected electrically by means, not shown, to a switch in the operator's cab to enable the operator to energize both the valves as required. As shown, the valves are in an de-energized state and thus the conduits 118 and 119 are closed and all fluid returning from the motors 32 and 33 must pass through either the flow combiner 102, or one of the restrictors 110 and 111. It can be seen that the flow restrictors 110 and 111 are in parallel with the flow combiner 102, and the isolating valves 114 and 115 are in parallel with the flow combiner and flow restrictors. When the valves 114 and 115 are opened, the conduits 118 and 119 have an essentially negligible resistance to flow when compared to the restrictors or the flow combiner, and thus nearly all fluid would flow preferentially through the conduits 118 and 119. When the vehicle goes into reverse, clearly the flow combiner functions as a flow divider and thus can accommodate reverse flow therethrough. Similarly, the isolating valves and flow restrictors can accommodate reverse flow therethrough when the vehicle operates in reverse mode.

The front logic block 39 further includes a hot oil shuttle valve 125 having a pair of inlet ports 127 and 128 which communicate with conduits 123 and 124 extending from the discharge 81 and the return 83 respectively of the pump 37, and thus the ports 127 and 128 are termed herein a discharge connecting port 127 and a return connecting port 128 respectively. The valve 125 also has an outlet port 130 communicating with an outlet line 132 which connects to the line 64 (FIG. 2) which, via the casings of the pumps, eventually communicates with the cooler 57 (FIG. 2). The port 130 also communicates with a gauge line 137 leading to a pressure gauge 138 for monitoring pressure.

The hot oil shuttle valve 125 is a three-way, three-position, pilot-pressure operated valve in which pilot lines 140 and 141 control position of the valve by being responsive to a pressure differential between the conduits 123 and 124 respectively. The valve 125 functions to divert fluid heated during operation of the vehicle to the cooler 57 by detecting a sufficient pressure difference between the appropriate pilot lines. For example, if pressure difference between the pilot lines 140 and 141 indicates that the pressure in the line 124 is very much less than that in the conduit 123, e.g. about 200 psi less, this pilot pressure difference actuates the valve 125 to connect the line 124 with the outlet port 130 to transmit fluid at lower pressure to the cooler through the lines 132, 64, etc. Thus the cooling valve 125 is responsive to pressure difference between conduits 123 and 124 extending from the discharge and return of the fluid source, and the outlet port 130 communicates with the cooler as required so as to direct fluid at the lowest pressure to the cooler. The pilot line with lowest pressure reflects "spent" fluid which is to be diverted to the cooler.

Pressure in the outlet line 132 is controlled by a pressure release valve 135 which similarly has a pilot line 145 which directs the pressure signal from the outlet port 130 through the line 132 so that the valve 135 controls back pressure on the shuttle valve to ensure a back pressure in the system.

The rear logic block 51 is generally similar to the front logic block and is essentially hydraulically independent therefrom, apart from the optional limited fluid connection in the interconnecting conduit 67, which interconnects the front and rear pumps 37 and 49, and also through the cooler conduits 62, 64 and 66 as seen in FIG. 2. Thus, loss of traction for one of the front wheels has a negligible effect on operation of the rear wheels and vice versa. Similarly to that previously described with reference to that logic block 39, the block 51 has valves equivalent to the valves 125 and 135 of FIG. 3 to pump heated fluid from the logic block 51 to the conduit 66 (FIG. 2), and to the cooler.

Figure 3:
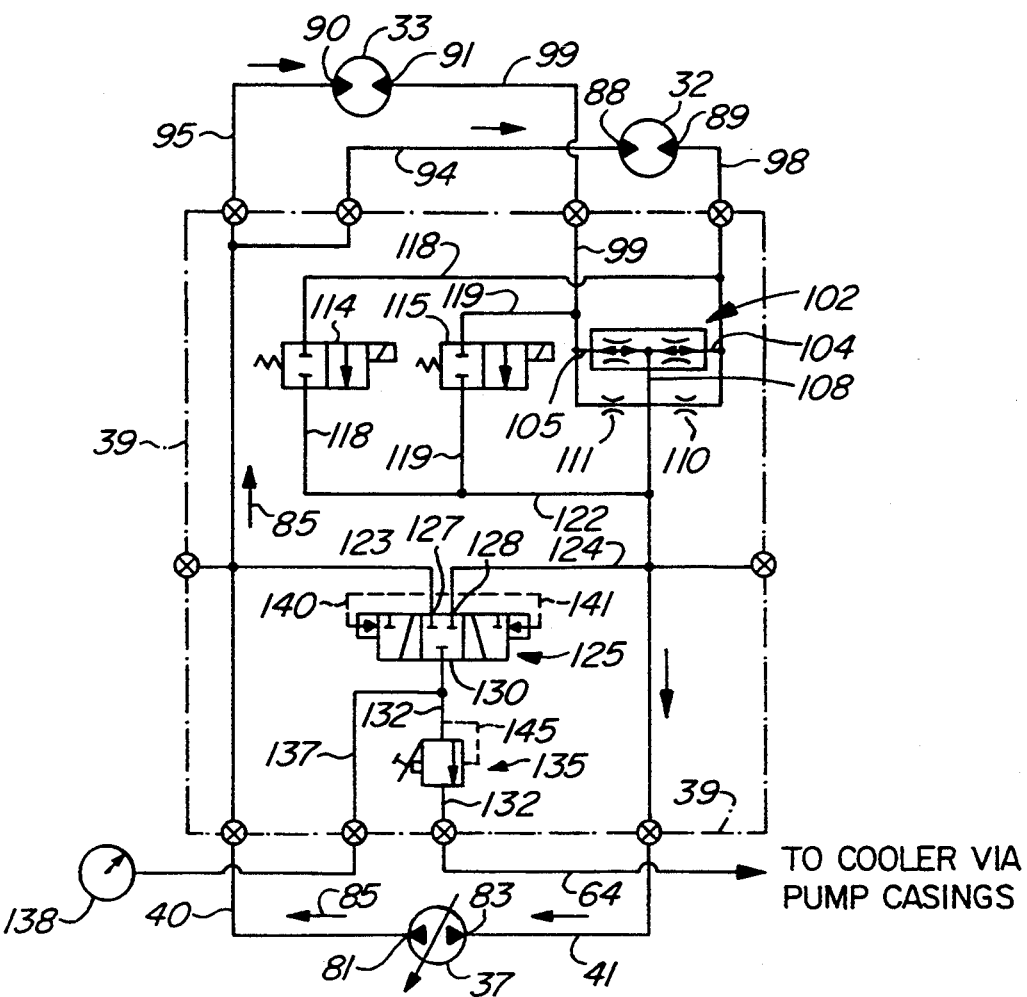
FIG. 3 is a simplified hydraulic schematic of one control block or logic block of the hydraulic drive system of FIG. 2.

Thus, it can be seen when the rear logic block and associated components are included in the total fluid circuit for the apparatus, the apparatus includes an additional pressurized hydraulic fluid source, namely the rear pump 49 of FIG. 2, the right hand and left hand wheel motors 44 and 45 of the rear unit, and additional right hand and left hand isolating valves and flow restrictors, not shown, which are equivalent to the valves 114 and 115 and flow restrictors 110 and 111 of FIG. 3. Similarly, an additional flow combiner, not shown, which is equivalent to the flow combiner 102 is provided for the rear logic block 51 which will function essentially identically to the block 39.

FIG. 4

A first embodiment 151 of a three-mode steering apparatus according to the invention will now be described. The right hand and left hand front wheels 22 and 23 and associated motors 32 and 33 (not shown) are mounted on the front axle beam 35 using conventional kingpin or modified Ackerman steering structure. Similarly, the rear wheels 24 and 25 and associated motors 44 and 45 (not shown) are mounted on the axle beam 47 with generally similar steering structure, and thus only the front wheel unit will be described in detail. Thus, each wheel is mounted on its respective unit for kingpin steering to permit rotation of each respective wheel about a respective generally vertical swivel axis relative to the respective unit. The swivel axes for the right hand and left hand front wheels are designated 154 and 155 and conventional kingpins or equivalents, suspension members, and bearings etc. are provided but are not shown or described in detail. For completeness, some main components will be described as follows.

The right hand wheel is mounted for rotation about a generally horizontal stub axle 158, shown in broken outline, which can be swung about the swivel axis 154 as is well known. The axle 158 also carries the hydraulic motor 32 (see FIG. 2), and thus the wheel and motor form an integral unit which is swung with respect to the axle beam 35 by use of a tie rod arm 160 and an actuator arm 162 which extend from the kingpin or equivalent and are inclined to the stub axle as shown. Similarly, the left hand wheel 23 can be swung and has a left hand tie rod arm 165 and a left hand actuator arm 166 inclined similarly as mirror images to the arms 160 and 162. Axes 167 and 168 of the tie rod arms 160 and 165 respectively are shown projected rearwardly and intersect at a intersection 164 which coincides with a rear axle axis 210 passing through the swivel axes 208 and 209 of the rear wheels. In other words, the tie rod arm axes projected rearwardly intersect at the rear axle axis 210 when the wheels are aligned straight, which follows conventional two-wheel kingpin steering design. A tie rod 169 is hinged to and extends transversely between the tie rod arms 160 and 165 to couple the front wheels together to coordinate swivelling of the front wheels and to effect modified Ackerman steering as is well known.

The embodiment 151 further includes right hand and left hand hydraulic kingpin steering cylinders 172 and 173 or steering actuators which extend between the respective actuator arms 162 and 166 and a portion of the front unit. The steering cylinder 172 has an extension port 177 and a retraction port 178 in which the kingpin cylinder extends or retracts when sufficient positive pressure is applied to the extension or retraction port respectively. Similarly, the left hand kingpin steering cylinder 173 has extension and retraction ports 181 and 182 respectively.

The operator cab 27 houses a steering wheel 186 mounted on a rotatable steering column 187 which is coupled to a conventional power steering valve and pump unit 189. The unit 189 is a conventional power steering unit comprising a four-way proportioning control valve having first and second signal ports 191 and 192, and an inlet port 185 which receives hydraulic fluid under pressure from a first steering pump 184. As in all steering valves herein, an undesignated fourth port returns fluid to a sump, not shown. Right hand extension and retraction conduits 198 and 199 extend between the ports 192 and 191, respectively. Similarly, left hand extension and retraction conduits 202 and 203 extend between the ports 191 and 192 respectively. Rotation of the steering wheel 186 changes flow through the valve 189 which directs fluid under pressure to appropriate chambers of the cylinders 172 and 173, so as to supply fluid in such a direction as to extend one cylinder and to retract the other, causing concurrent swivelling of the front wheels about the respective axes to effect kingpin steering. The tie rod 169 couples the wheels together to coordinate swivelling and thus, in theory, only one kingpin steering cylinder is required. However, following common practice, to reduce loads on the tie rod and to enable smaller diameter cylinders to be used, it is preferable to have two kingpin cylinders 172 and 173 which extend and retract simultaneously and thus work in concert with each other and in combination with the tie rod 169. Structure associated with the front wheel steering is essentially conventional, and provides front kingpin steering to control swivel angle of the front wheels, and thus further description is deemed unnecessary. As is also common practice, the unit 189 incorporates a pump to permit steering if the hydraulic pressure from the pump 184 becomes unusable.

The rear wheels 24 and 25 are also mounted for kingpin steering with respect to the rear axle beam 47, and thus are mounted to swivel about generally vertical swivel axes 208 and 209 respectively. Similarly to the front wheels, the rear wheels have tie rod arms and actuator arms extending as shown, which cooperate with a transversely extending tie rod 211, and right hand and left hand kingpin steering cylinders or steering actuators 212 and 213 respectively. Similarly to the front wheel tie rod arms, axes of the rear wheel tie rod arms associated with the rear wheels are inclined equally to the longitudinal vehicle axis when the wheels are aligned for straight line travel and when projected forwardly intersect at an axis of the front wheel axle.

In contrast to the front wheel steering which uses the power steering unit 189, the rear wheel steering is controlled by an electrically actuated steering valve 216. The valve 216 is a four-way, three-position, closed-centre, solenoid-operated directional valve which has a first signal port 218 communicating with corresponding undesignated retraction and extension ports in the cylinders 212 and 213, and a second signal port communicating with corresponding undesignated extension and retraction ports in the cylinders 212 and 213. The valve 216 has an inlet port 223 which receives pressurized fluid under pressure through a fluid supply line 224, which in turn receives fluid under pressure from a second hydraulic steering pump 226 which is generally equivalent to the pump 184. The valve 216 is controlled remotely from the operator cab through electrical wires, not shown, which connect to a simple manually-actuated two-way switch in the cab which controls the valve 216 to direct fluid as required to opposite sides of pistons in the cylinders 212 and 213 to simultaneously extend and retract the cylinders to effect rear wheel steering. This provides two similar modes of steering which has advantages as will be described with reference to FIGS. 5 and 6. Thus, the rear kingpin steering control for the rear unit comprises a rear steering actuator unit which is a directional control valve controlling angle of the rear wheels with respect to the rear unit.

The pump 226 also supplies fluid under pressure to an auxiliary power take-off 228 which can be used to power equipment on a vehicle such as the blade 30 and the boom 31 as shown in FIG. 1. The blade and/or boom is controlled through an auxiliary valve unit 230 which receives hydraulic fluid under pressure from a line 232 connecting with the line 224.

The three-mode steering apparatus also includes articulation steering about the articulation joint 16 which is controlled by a manually actuated articulation steering valve 225 also controlled in the cab. The valve 225 is a four-way, three-position, closed-centre, solenoid-operated directional valve which can be generally similar to the valve 216 and which receives pressurized fluid through the line 232 from the pump 226 similarly to the valve 230. The front and rear units are swivelled about the axis 18 by right hand and left hand hydraulic articulation steering cylinders or articulation actuators 236 and 237. The cylinders 236 and 237 are parallel to each other, extend between the front and rear units, and are spaced on opposite sides of the articulation joint with respect to the longitudinal axis of the vehicle. The cylinders are essentially similar, and thus only the right hand cylinder will be described. The cylinder 236 has extension and retraction ports 240 and 241 respectively which cooperate with first and second signal ports 242 and 243 respectively of the valve 225. The left hand articulation actuating cylinder 237 has similar extension and retraction ports which similarly cooperate with the valve 225. Clearly, extension of one cylinder and simultaneous retraction of the other cylinder causes the units 13 and 14 to swivel about the axis 18 as is common practise. Thus, the vehicle has an articulation steering control which is a directional flow control valve i.e. the valve 225, which interchanges connectors between the articulation cylinders for controlling the articulation angle between the front and rear units.

It can be seen that the actuation of kingpin steering of the rear wheels is controlled with the valve 216, and actuation of the articulation steering is controlled through the valve 225, which valves are similarly controlled remotely by respective electrical switches in the cab. Both types of valves permit control of flow direction to and from the appropriate cylinders, and thus steering angles intermediate of full lock-to-lock positions for both the swivel angles and the articulation angle can be attained. Usually, the resulting steering angle for either the rear steering wheels, or the articulation joint is proportional to the time that the particular manual control switch is actuated. In other words, the longer the operator maintains a particular valve "on", i.e. being actuated, the greater the change in the steering angle.

Similarly to conventional vehicles, the present invention is shown with two articulation steering cylinders 236 and 237. In some vehicles, a single articulation steering actuator which cooperates with the front and rear units to cause the said relative rotation can be substituted for the two steering cylinders as shown.

Clearly, there are three independent main controls in the cab for the three modes of steering as described. One control, e.g. a switch for the valve 225, controls actuation of the articulation steering actuator extending between the front and rear units. There is also the steering wheel 186 and the valve 216 for controlling actuation of the kingpin steering actuators with respect to at least one or both of the units i.e. the front, or the front and rear wheels.

In summary, it can be seen that front and rear kingpin steering actuators cooperate with each pair of the front and rear wheels respectively to cause the rotation about the respective vertical swivel axes to effect independent and proportional kingpin steering between the wheels of the respective units as required. Clearly, the articulation steering control is also operable independently of the control for controlling actuation of the kingpin steering actuators with respect to at least one or both of the units.

OPERATION

Operation of the apparatus follows generally that of similar prior art apparatus, with the exception that operation of this apparatus has a choice of three steering modes, namely front wheel kingpin steering, rear wheel kingpin steering, and articulation steering or a combination thereof. This results in a more manoeuvrable vehicle which requires less lateral space for passing between obstructions in congested areas. The operator steers the vehicles using the steering wheel in a relatively conventional manner for single mode front wheel kingpin steering, and selects articulated steering and/or rear wheel kingpin steering modes where appropriate, thus incorporating the two or three modes of the steering when required.

FIG. 5

The vehicle 10 is shown negotiating a turn of minimum radius 251 about a turn centre 253, and this requires front and rear wheel kingpin steering and articulation steering. For convenience of explanation, a transverse axis 255 is shown passing through the turn centre and the articulation axis 18, the axis 18 passing along a circular arc 256 in direction of an arrow as shown. To negotiate this turn, the axis 19 of the front unit and the axis 20 of the rear unit are inclined to each other at an angle 258 as shown. The front wheels 22 and 23 are rotating about front wheel axes 260 and 261 which, when projected inwardly, intersect the axis 255 at intersection points 264 and 265 respectively. Similarly, the rear wheels 24 and 25 are rotating about rear wheel axes 268 and 269 respectively which intersect the axis 255 also at the points 264 and 265 respectively. The intersection points 264 and 265 of the axes of the wheels on the outside and inside of the turn respectively are spaced apart, indicating that some scuffing of the wheels will take place in this mode of steering. The said wheel scuffing can be reduced if at least one swivel angle of the front wheels is "corrected" as will be described with reference to FIGS. 7–11.

It can be seen that the rear wheels follow closely behind the front wheels and this is not a problem on a hard surface. However, if desired, the front and/or rear steering can be adjusted so that the rear wheels trace an arc different from the arc traced out by the front wheels. In this way, the rear wheels do not pass over paths 262 and 263 of the front wheels 22 and 23 which is advantageous when operating in sensitive terrain, as it reduces terrain damage. In addition, the rear unit can be made to follow closely behind the front unit, thus requiring less lateral spacing between obstructions. This contrasts with conventional kingpin steering on a rigid chassis, in which, during a tight turn, the rear wheels "cut off" as a chord the arc traced out by the front wheels while negotiating the turn. The "cutting off" by the rear wheels occurring in conventional steering requires additional space between obstructions, which would not be required in the present invention. Even when the present invention is contrasted with the prior art vehicle having a combination of articulated steering and front wheel kingpin steering only, the present invention requires less space for turning when the rear wheels are swivelled in an equal but opposite direction to the front wheels, and the body is actuated in the same direction as the front wheels as shown.

Figure 5:
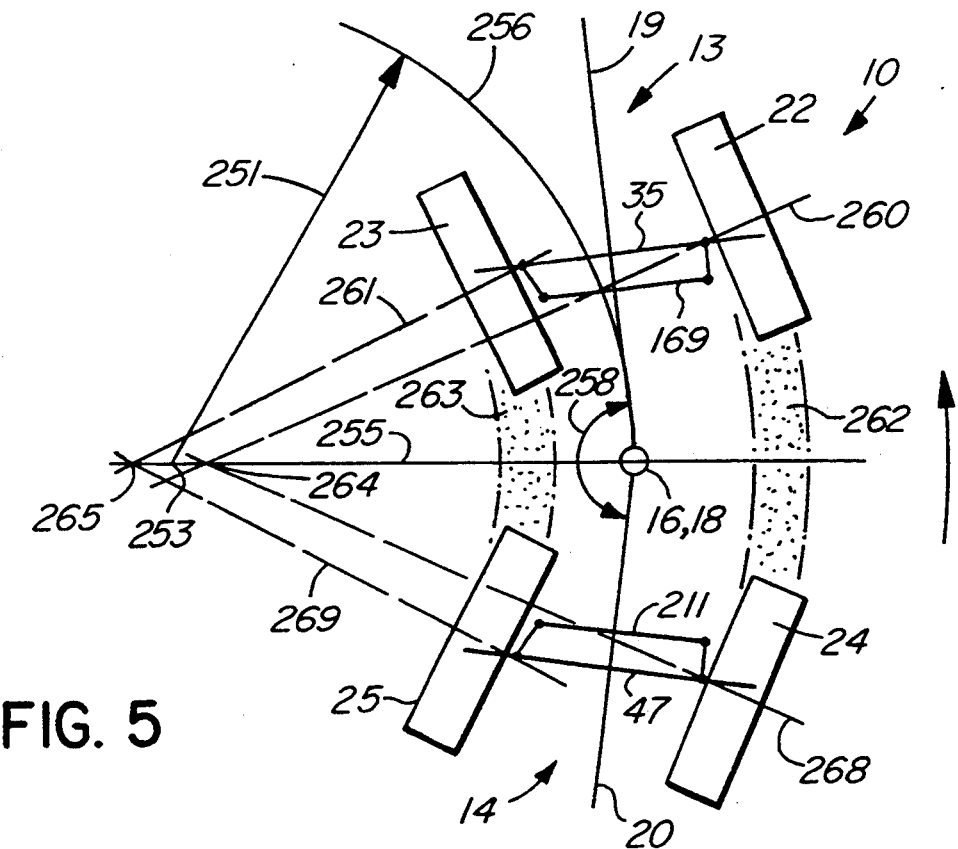
FIG. 5 is a simplified diagram showing wheels and main steering components of a vehicle according to the invention negotiating a tight turn when using the combination of three modes of steering with a fixed length tie rod.
Figure 6:
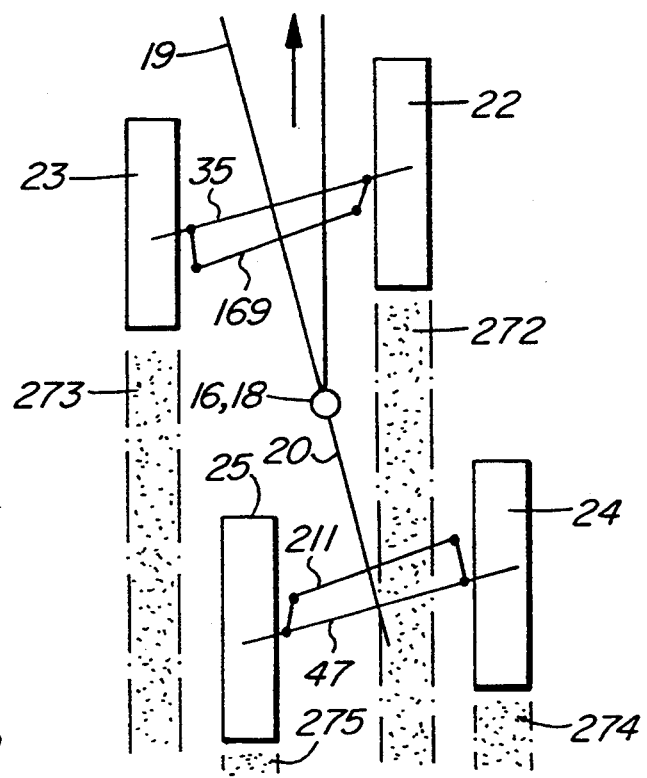
FIG. 6 is a simplified diagram similar to FIG. 5, the same vehicle being shown in a crab-like straight line motion.

While the description above refers to FIG. 5 in which three modes of steering are shown, clearly it would be also applicable for applications in which only one or two steering modes are used, in which cases the radius of the turn would be larger and the flow differential (as defined with reference to FIG. 5) would be correspondingly less.

FIG. 6

The vehicle is shown travelling in a straight line in direction of the undesignated arrow, with the unit axes 19 and 20 aligned with each other and the wheels of each unit being swivelled equally to each other to be set in a crab-like mode. Thus paths 272 and 273 of the front wheels 22 and 23 are not traversed by the rear wheels 24 and 25, which produce respective paths 274 and 275 which are spaced laterally from the paths 272 and 273 as shown. Thus the rear wheels do not traverse terrain already traversed by the front wheels, thus reducing terrain impact.

FIGS. 2 and 3

The front and rear logic blocks 39 and 51 operate generally similarly, and thus description of the hydraulic circuit will be limited to that shown in FIG. 3, except where there is cooperation between the two logic blocks which are shown only in FIG. 2.

Referring to FIG. 3, during forward travel the front hydraulic pump 37 discharges pressurized fluid (in "forward direction") shown by the arrow 85 along the main conduit 40 which supplies fluid to the inlets of the right hand and left hand motors 32 and 33 respectively. Several types of operation on different types of surfaces will be described as follows.

Driving in an essentially straight line in good traction conditions (i.e. on a non-slipping surface) is a very common mode of operation in some applications. In this type of application there is negligible slippage between the wheels so that the wheels rotate at essentially equal speeds and essentially equal fluid volumes pass through the motors to be discharged into the outlet conduits 98 and 99 respectively. If the operator knows that there will be little tendency for the wheels to slip, the isolating valves 114 and 115 can be energized, so that the valves are opened and essentially equal volumes of fluid from the motors pass primarily through the conduits 98 and 99, i.e. most flow bypasses the higher resistance of the flow combiner/divider 102 and the orifices 110 and 111. Because most of the fluid from the motors 32 and 33 passes through the valves 114 and 115, relatively little flows through the orifices 110 and 111 and essentially none flows through the flow combiner/divider 102 which therefore operates at a very low rate, and thus relatively little heat is generated in the fluid which is returned to the pump.

When the operator anticipates that the vehicle will be required to negotiate a series of curves in good traction conditions, the valves 14 and 15 can be energized so as to be opened similarly to straight line travel. Thus, the fluid bypasses the flow combiner and orifices and flows through the valves 114 and 115 in associated conduits as before. However, when negotiating a turn there is the flow differential as previously defined between flow through the motors driving the wheels on the outside of the turn, and motors on the inside of the turn. Because the valves 114 and 115 are open and the conduits 118 and 119 offer little resistance to flow, most of the fluid flowing through the motors passes through the conduits 118 and 119. The conduits have sufficient capacity to accommodate most if not all of the flow differential between the motors of the wheels of the inside and the outside of the turn, and thus there is negligible wheel scuffing during turning and negligible heat generated by the orifices and flow combiner which are effectively bypassed by the conduits 118 and 199.

In contrast, when the vehicle is driven in a straight line in poor traction conditions, (e.g. on a slippy surface) it is important that both wheels are controlled to rotate at approximately the same speed, and consequently the valves 114 and 115 are maintained closed so that all flow from the motors passes through one of the orifices or the flow combiner. The flow combiner 102 attempts to maintain the output flows generally equal to each other, and any minor differences in flows passing through the orifices 110 or 111 is immaterial and essentially independent of the flow combiner. Wheel slippage can occur during straight line travel, but in general any terrain damage caused by such slippage is usually negligible. Thus, if one wheel starts to slip when the vehicle is travelling in a straight line, if there were no flow combiner, the flow through the motor of that wheel would increase, thereby further compounding the speed difference. However, when there is a flow combiner, the flow through the motor of the slipping wheel does not increase appreciably but only at a rate dependent on the flow combiner and the orifices. Thus one of the wheels can slip, but the slippage is limited by the orifices and flow combiner and thus the wheel does not slip in an uncontrollable manner, and thus causes negligible damage to the terrain.

When negotiating a turn in poor traction conditions, the valves 114 and 115 are again closed and thus all flow from the motors passes through one of the orifices or the flow combiner. For example, when negotiating a left hand turn as shown in FIG. 5, the right hand wheels 22 and 24, on the outside of the turn, rotate at higher speeds than the left hand wheels 23 and 25 on the inside of the turn. Consequently, volume of flow passing through the right hand motors 32 and 44 is greater than the volume passing through the left hand motors 33 and 45. Thus, as shown in FIG. 3, flow through the conduit 98 is greater than flow through the conduit 99, and the difference in flow is accommodated by the orifices 110 and 111 because the flow combiner attempts to match the flows. The orifices can pass the flow differential to a maximum of about 10 per cent as previously described, and thus speed differential between the wheels in a turn of minimum radius is approximately 10 per cent, although it is also dependent on speed of the vehicle. The approximate 10 per cent speed differential between the wheels is usually sufficient to permit the tightest turn to be negotiated with negligible scuffing between the wheels. If the outside wheel starts to slip, the flow through that motor would attempt to increase further, but any increase would again be restricted by the orifices and the flow combiner, improving transfer of power to the non-slipping inside wheel.

Size of the orifices of the restrictors 110 and 111 is found by trial and error by visually monitoring wheel scuffing while executing tight turns and adjusting size of the orifice accordingly to reduce wheel scuffing to a minimum. It has been found that wheel scuffing can be easily detected on a delicate surface and thus it is advantageous to perform such testing on a delicate surface, that is a surface which is easily recognizable to be damaged by scuffing. From a practical standpoint, the orifices are made to be interchangeable and are tested by initially using a size that is too small and increasing the size incrementally to determine the minimum size that can accommodate the maximum flow differential. Preferably, size of the orifice can be easily adjusted externally of the apparatus by locating the orifices in a convenient and accessible place to enable the operator to make the adjustment. This would be particularly necessary if the vehicle operated at different times with different size wheels. It is added that size of the orifices should be selected to accommodate maximum flow differential that will occur with a turn of minimum radius, that is as shown in FIG. 5, with the vehicle operating with a combination of three modes of steering. Clearly, if the vehicle executes turns of a greater radius, the flow differential will be less but the orifices will function in a similar manner.

When the vehicle descends a grade in the forward direction in any surface condition, the flow combiner is operative by closing the isolating valves 114 and 115, thus ensuring that most of the flow passes through the flow combiner. As the flow combiner receives fluid from the outlets of the motors, when weight of the vehicle dominates and "drives" the motors which act as pumps and transmit pressurized fluid to the pump 37. The pump 37 in turn now acts as a motor and attempts to drive the engine 29 as is well known. The pump 37 can still maintain an output pressure in the inlets 88 and 90 of the motors because there is no restriction at the inlets that occurs in some prior art apparatus in which a flow divider is commonly fitted upstream from the motors. In prior art apparatus fitted with a flow divider upstream from the motors, when descending a grade, the inlet of the motors can be exposed to low pressure due to flow restriction caused by the flow divider, which can produce cavitation difficulties. Thus, when descending a grade with the motors acting as brakes, in the present invention, the motors operate under higher pressure than in some prior art vehicles, thus avoiding prior art cavitation problems. Fluid restriction at outlets of the motors 32 and 33 caused by the flow combiner 102 also increases pressure slightly at the outlets of the motors but this has a negligible effect.

From the above, it can be seen that the isolating valves 114 and 115 are normally maintained closed to permit full use of the flow combiner and orifices for operating conditions such as excessive turning, descending grades, and/or use on poor traction surfaces, in which conditions the vehicle is usually travelling relatively slowly. When travelling relatively slowly, in general fluid heating problems are reduced because flow through the flow divider is reduced. However, when the vehicle is travelling on good traction surfaces in a straight line, for example being ferried from one site to another, typically the vehicle operates at relatively high speed, and at such times the isolating valves are activated, so as to bypass the flow combiner. In this latter situation, if a flow combiner were being used, it would be handling a considerable fluid flow, and thus would likely cause severe heating of the fluid, and thus it can be seen that the ability to isolate the flow combiner in relatively high speed operation of the vehicle provides a considerable advantage by reducing cooling demands.

ALTERNATIVES

The first embodiment of the invention has three independent modes of steering and only one of these is easily and accurately controlled by the operator, that is the front wheel kingpin steering as controlled through the steering wheel in the normal manner. The articulation steering between the front and rear units, and the rear wheel kingpin steering both require separate individual manual control, which can be difficult to operate for a novice operator, or when negotiating a constricted area while performing other tasks with the apparatus carried by the vehicle. In these circumstances it is more convenient to have an apparatus which automatically combines two or even three modes of steering, preferably all modes being operable through a single operator control, for example, the steering wheel. Two examples of a vehicle combining two modes of steering are described with reference to FIGS. 7 through 11.

FIG. 7

A second embodiment vehicle 280 is shown fitted with a first alternative combination steering apparatus 282 which is a combination of front wheel kingpin steering and articulation steering, termed integrated steering, which also uses automatic compensation of the kingpin steering swivel angles as will be described. Much of the vehicle 280 is the same as the vehicle 10 of FIGS. 1 through 4 and consequently components which are essentially identical are designated with identical numerical references. For simplicity, only the major differences between the two types of steering apparatus will be described.

Figure 4:
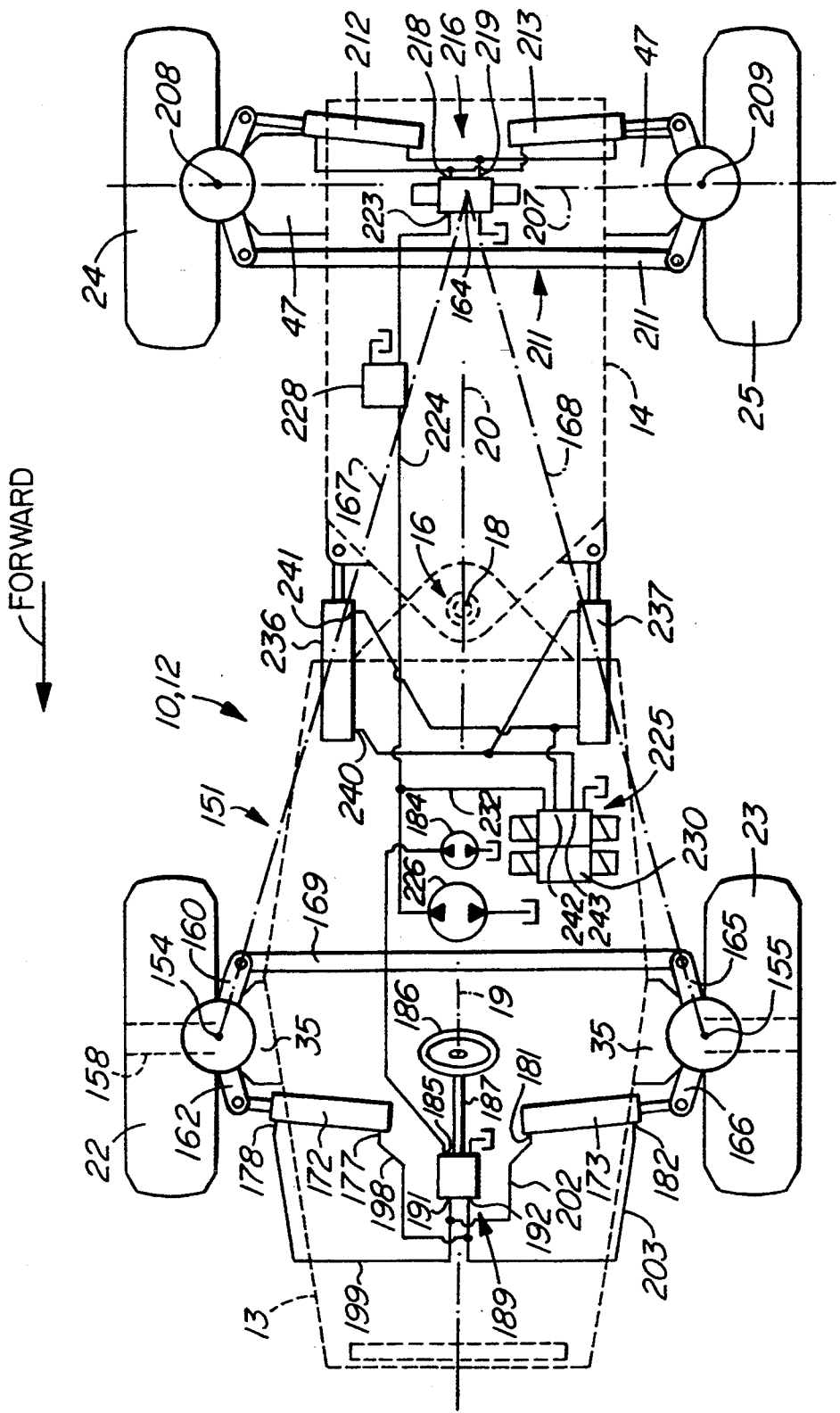
FIG. 4 is a simplified mechanical diagram and hydraulic schematic of a first embodiment of a manual combination two or three-mode steering apparatus according to the invention.
Figure 7:
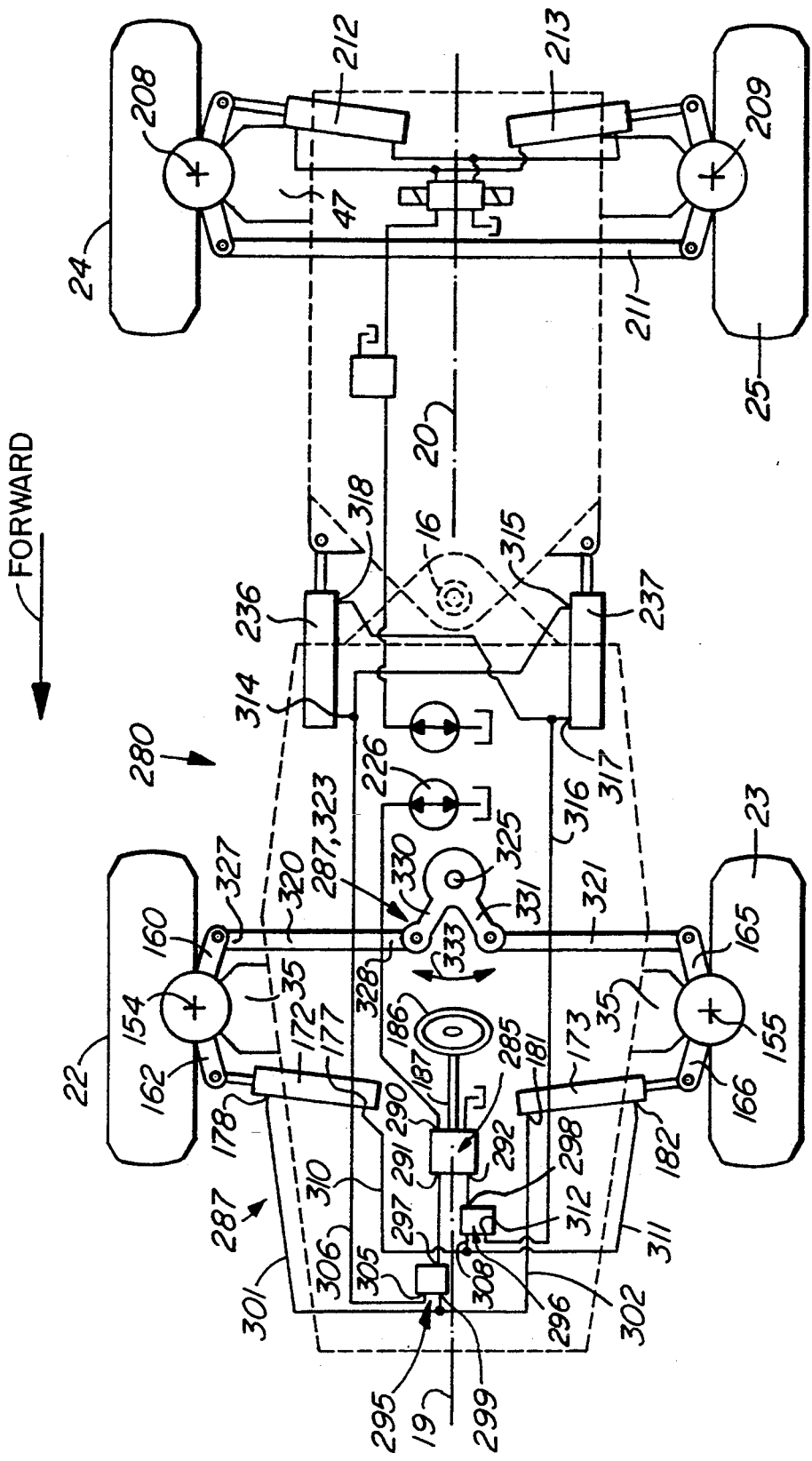
FIG. 7 is a simplified mechanical diagram and hydraulic schematic generally similar to FIG. 4, showing main steering components of a second embodiment of a steering apparatus according to the invention.

The two main differences between the apparatus 282 of FIG. 7 relate to substitution of an alternative power steering valve and pump unit 285 and related valves for the unit 189 of FIG. 4, and a substitute of an alternative tie rod assembly 287 for the tie rod 169 of FIG. 4.

The steering valve unit 285 is a conventional four-way power steering valve and pump unit which can be similar to the unit 189 of FIG. 4 and is controlled by rotation of the column 187 to serve as a primary steering signal apparatus. The valve unit 285 is responsive to rotation of the manual steering control and has first and second primary signal ports 291 and 292 which serve as a primary signal output, and an inlet port 290 which receives pressurized fluid from the pump 226. The steering apparatus 282 also includes first and second proportioning valves 295 and 296 which are conventional three-way proportioning valves having inputs 297 and 298 respectively which communicate with the first and second primary signal ports 291 and 292 respectively to receive signals therefrom. The first proportioning valve 295 also has a first front output 299 which communicates with the actuators 172 and 173 through first conduits 301 and 302 respectively. Similarly, the second proportioning valve 296 also has a second front output 308 which communicates with the actuators 172 and 173 through second conduits 310 and 311 respectively. Thus the first front output 299 communicates with the retraction and extension ports 178 and 181 of the cylinders 172 and 173 respectively, and the second front output 308 communicates with the extension and retraction ports 177 and 182 of the cylinders 172 and 173. This coupling ensures concurrent extension and retraction or vice versa of the cylinders 172 and 173.

The first proportioning valve 295 has a first rear output 305 which communicates through a second conduit 306 with extension and traction ports 314 and 315 of the articulation actuators 236 and 237 respectively. Similarly, the second proportioning valve 296 has a second rear output 312 which communicates through a second conduit 316 with extension and retraction ports 317 and 318 of the articulation cylinders 237 and 236 as shown. Thus, it can be seen that the first and second proportioning valves 295 and 296 are a portion of a second rear steering signal apparatus which comprises first and second proportioning units, namely the valves 295 and 296, having first and second input ports communicating with the first and second primary signal ports of the primary steering signal apparatus, with each proportioning unit also having a front output and a rear output. The front output of each proportioning unit communicates with the front kingpin steering actuator, and the rear output of each proportioning unit communicates with the articulation steering actuator. The steering valve unit 285 is shown as having two primary signal ports 291 and 292, and thus this functions as a primary steering signal apparatus which is responsive to the manual steering control and has a primary signal output. The two proportioning valves 295 and 296 serve as secondary signal steering apparatus having an input, namely the inputs 297 and 298, which are connectable to the primary signal output of the primary steering signal apparatus. The secondary steering signal apparatus has first and second outputs, namely the rear outputs 305 and 312 which are transmitted to the articulation steering actuator, and a second output, namely the front outputs 299 and 308, which are transmitted to the front kingpin steering actuators. The first and second outputs have an output signal ratio which reflects the controlled proportional relationship between the angle of the front unit with respect to the rear unit and the swivel angles of the front wheels with respect to the front unit.

The output signal ratio as described above is dependent on many variables which relate to physical characteristics of the vehicle itself. Such characteristics include wheel base of the vehicle, that is longitudinal spacing between wheels on the same side of the vehicle, track of the wheels, that is transverse spacing between the wheels of a unit, relative lengths of the actuating arms 162, 166 and position of the kingpin steering cylinders, length of the tie rod arms 160, 165 lateral spacing of the articulation cylinders 236, 237 from the articulation axis 18, relative displacements of the kingpin steering cylinders 172, 173 and the articulation cylinders 236 and 237 and other variables as is known. However, for a vehicle in which all the above characteristics are fixed, there is an important ratio between displacement of fluid from the first and second proportioning valves, in response to the displacement of fluid from the alternative power steering valve and pump unit 285. This ratio is determined by geometrical considerations which are briefly discussed with respect to FIGS. 9 and 10, and also with respect to the alternative tie rod assembly 287 as follows.

The alternative tie rod assembly 287 comprises right hand and left hand tie rod portions 320 and 321 respectively and a steering bellcrank 323 journalled for rotation with respect to the front unit about a bellcrank axis 325. The tie rod portions are of equal length and the axis 325 intersects the unit axis 19, i.e. the bellcrank is symmetrically located. The tie rod portion 320 has an outer end 327 connected to the tie rod arm 160 of the right hand wheel and an inner end 328 connected to a right hand arm 330 of the bellcrank 323. Similarly, the left hand tie rod portion 321 is connected to the left hand tie rod arm 165 and a left hand arm 331 of the bellcrank. When the wheels are aligned symmetrically with respect to the front unit for straight line travel, the bellcrank 325 is disposed symmetrically with respect to the axis of the front unit and the rod portions 321 and 320 are effectively aligned as shown. This is essentially equivalent to a solid, one-piece tie rod, for example the rod 169 as shown in the first embodiment. However, as the bellcrank rotates about the axis 325, overall or effective length of the tie rod assembly decreases which causes the swivel angles through which the front wheels rotate to be less than if the tie rod length were constant. Thus, it can be seen that, as the swivel angles of the front wheels increase with respect to the front unit, the bellcrank rotates through an increasingly larger angle from the symmetrical aligned position and effective length of the tie rod decreases proportionately. As effective length of the tie rod decreases as the overall angle of the wheels increases, rate of increase of the swivel angles of the front wheels decreases from the increase which would occur with a one piece tie rod. This overall decrease in swivel angle is referred to as "swivel angle correction" and is necessary to avoid wheel scuffing due to articulation about the articulation axis 18 as will be described with reference to FIGS. 8–10.

Thus, the bellcrank 323 and two rod portions serve as a shortening structure for a shortening effective length of the tie rod assembly as the wheels are swivelled from a straight travel alignment configuration towards a "hard lock configuration turn". The arms 330 and 331 are disposed to each other at an angle 333, which is about 60–70 degrees as shown. Preferably, to enable easy adjustment of the amount of "tie rod shortening" generated by the bellcrank, to find the optimum geometry by experience the angle 333 can be made to be variable by simple mechanical adjustment, e.g. nuts and bolts fitting into alignable openings of the arms, not shown. It is anticipated that for many vehicles, the angle 333 will be within a range of 40–100 degrees.

It can be seen that actuation of the articulation steering actuators 236 and 237, and the kingpin steering actuators 172 and 173 of the front wheels are combined or integrated by the primary steering signal apparatus, namely the valve unit 285, and the secondary steering signal apparatus, namely the valves 295 and 296. The valve unit 285 and the valves 295 and 296 act as a steering integrator to ensure that a controlled relationship exists between an articulation angle of the front unit with respect to the rear unit, and the swivel angles of the front wheels with respect to the front unit. The wheel 186 provides a manual steering control for controlling actuation of the steering actuator which in turn controls the articulation angle between the front and rear units, and the respective swivel angles of the right hand and left hand front wheels with respect to the front unit. The steering integrator function with the tie rod shortening structure, that is the bellcrank and the two interconnected tie rod portions which ensure that the swivel angles of the front wheels are corrected in proportion to the articulation angle as will be described with reference to FIGS. 8 through 10.

Figure 8:
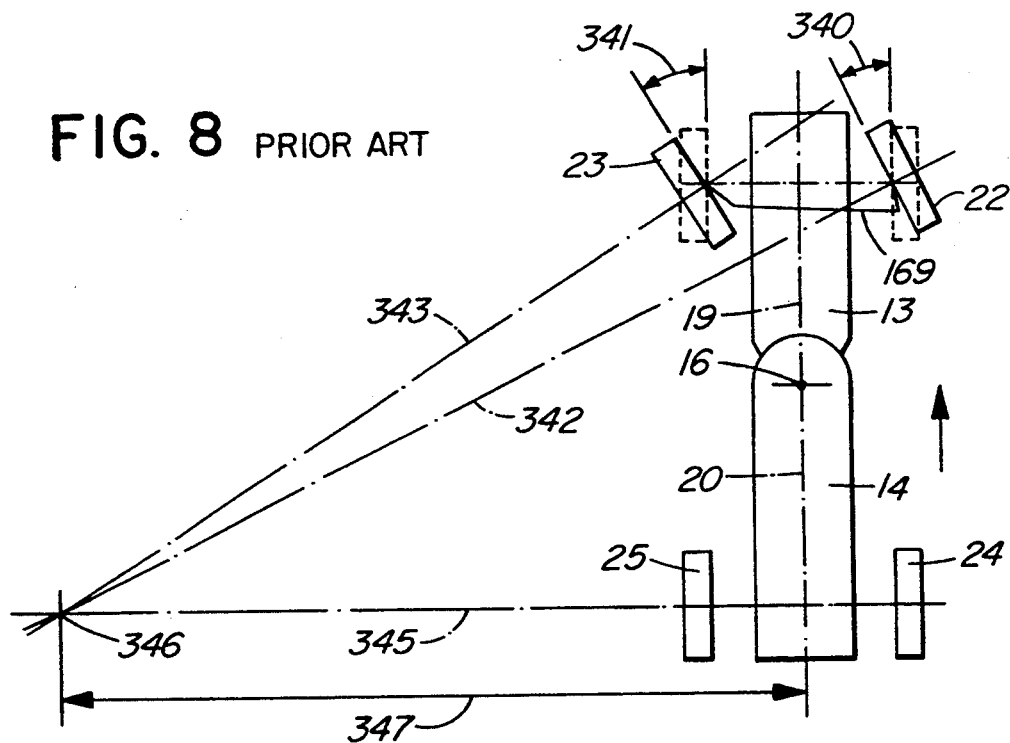
FIG. 8 is a simplified diagram showing vehicle geometry of single mode front wheel kingpin or modified Ackerman steering without the articulation steering, i.e. with the front and rear units locked in an aligned position.
Figure 9:
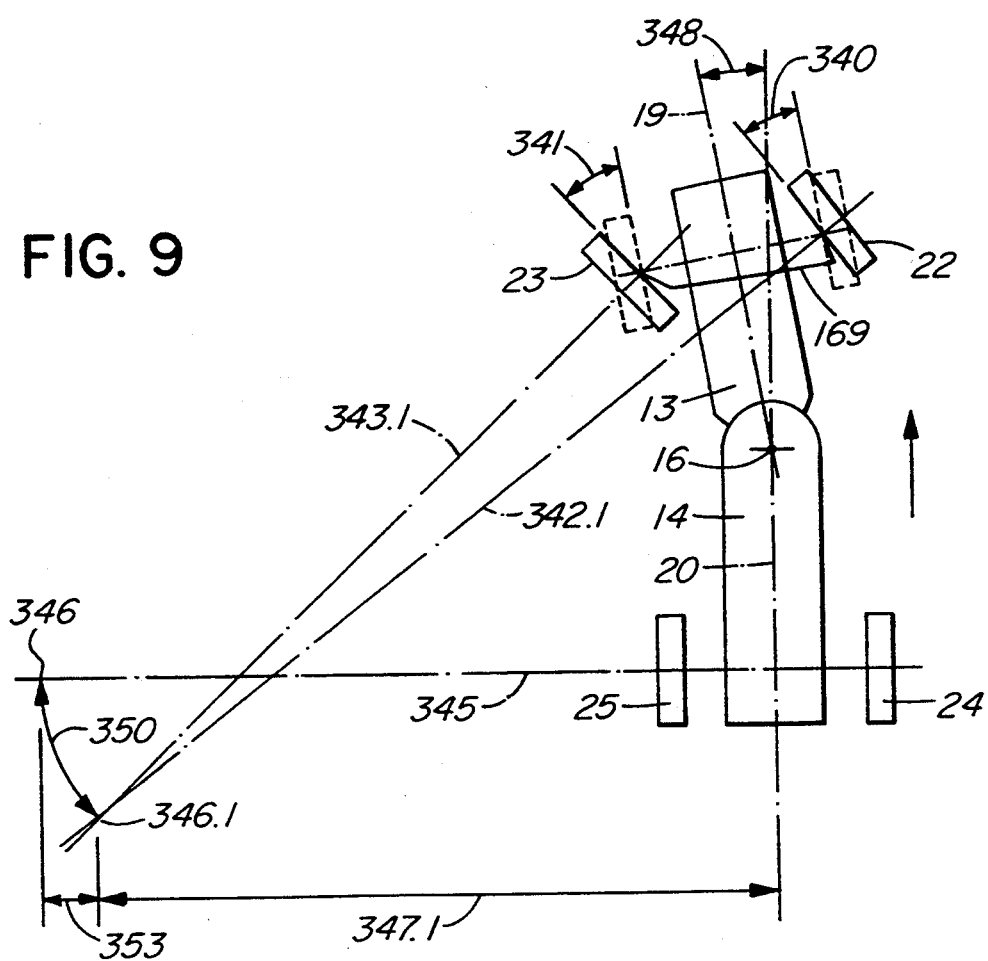
FIG. 9 is a diagram generally similar to FIG. 8 but showing a two mode steering combination of articulation steering and front wheel kingpin steering, for a vehicle with a fixed length tie rod without swivel angle correction.
Figure 10:
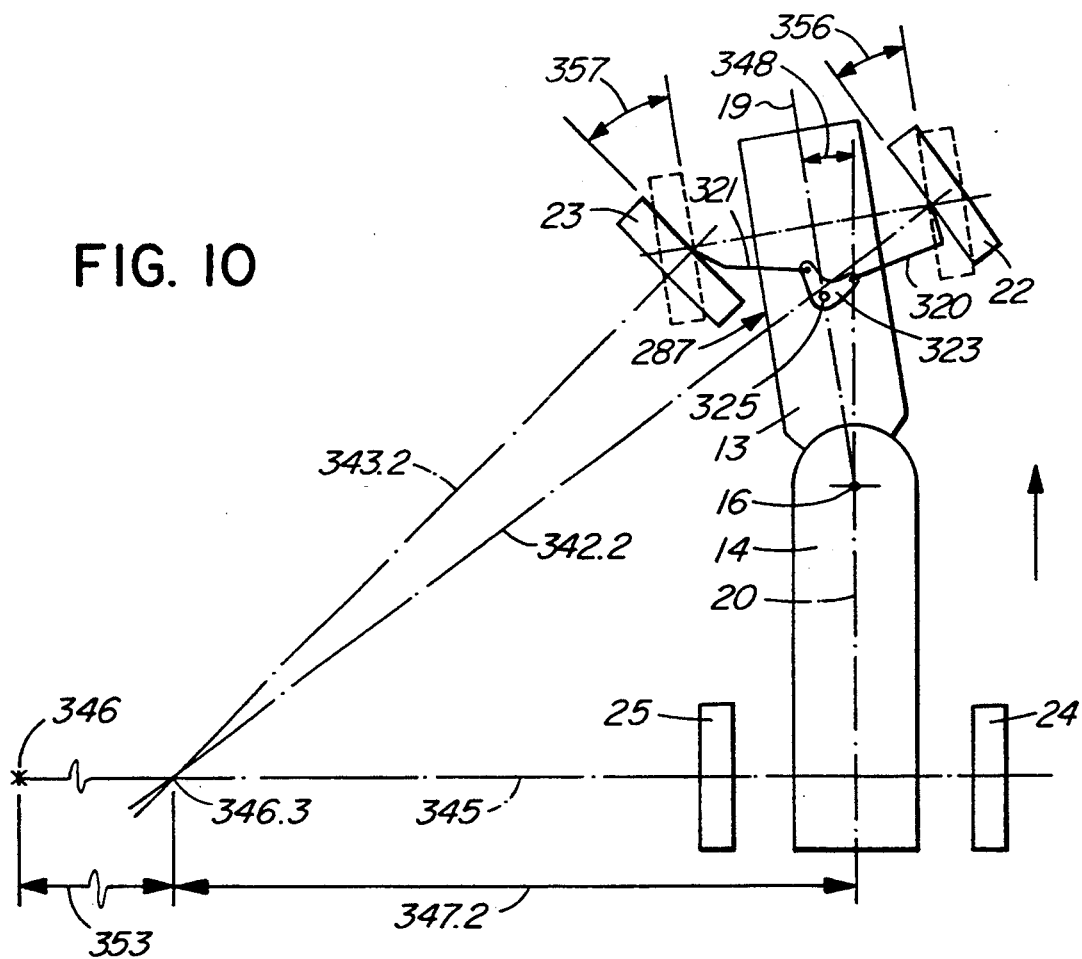
FIG. 10 is a diagram which is generally similar to FIG. 9, but showing a vehicle with variable length tie rod providing automatic swivel angle correction and a reduced turning radius of the vehicle, in a two mode steering combination of front wheel kingpin steering and articulation steering.
Figure 11:
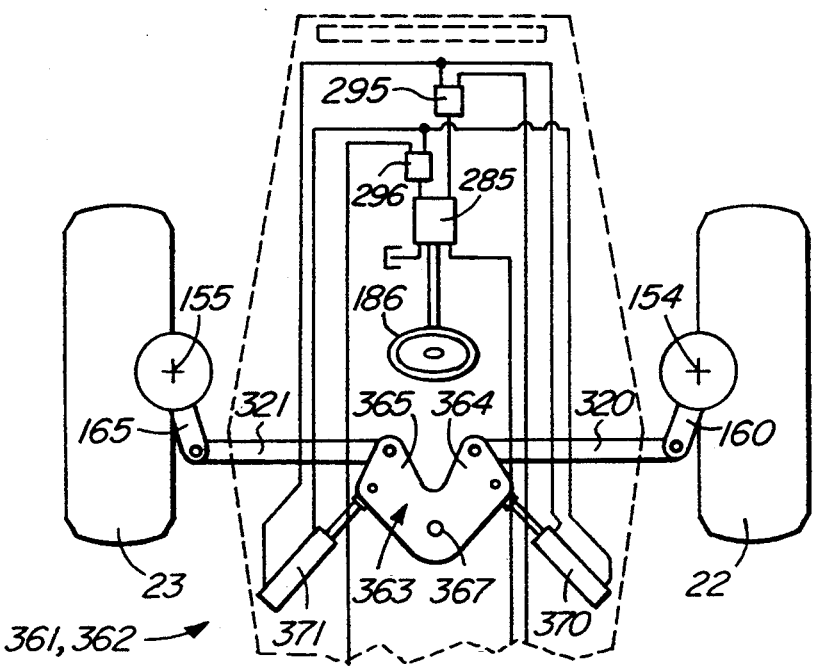
FIG. 11 is a simplified fragmented mechanical diagram and hydraulic schematic generally similar to FIG. 7, but showing only a portion of a front unit of the vehicle, and illustrating a third embodiment of a steering apparatus according to the invention.

FIGS. 8 through 10

FIGS. 8 through 10 shows operation of main components of the vehicle 10 in two modes of steering, thus illustrating main geometrical considerations which characterize each mode of steering. In these FIGS. 8 through 10, the front wheels 22 and 23 are shown undesignated in broken outline in straight alignment, and in full outline when swivelled to negotiate a turn.

Referring to FIG. 8, the front and rear units 13 and 14 are maintained aligned, that is the articulation joint 16 is made inactive thus eliminating the second mode of steering. The front wheels 22 and 23 are mounted for kingpin steering for the first mode of steering and the rear wheels 24 and 25 are non-steering wheels, that is they are journalled only for rotation about wheel axes and thus eliminates the third mode of rear wheel kingpin steering.

The front wheels 22 and 23 are shown inclined at swivel angles 340 and 341 to the straight aligned position of the wheels. If any minor angulation of the wheels due to "toe-in" is ignored, the angles 340 and 341 represent swivel angles of the front wheels with respect to the axis 19 of the front unit. As is well known, the angle 340 of the right hand wheel 22 on the outside of the turn is smaller than the angle 341 of the left hand wheel 23 on the inside of the turn. The one-piece tie rod 169 of FIG. 4 is shown extending between the tie rod arms of the wheels. This represents conventional kingpin or modified Ackerman steering, in which axes 342 and 343 of the front wheels 22 and 23 projected inwardly and intersect at a point of intersection 346. The intersection 346 coincides with a projection of coincident rear wheel axes 345 of the rear wheels 24 and 25, which, as previously stated, are non-steering. This geometry results in negligible scuffing of the wheels as the vehicle negotiates a turn centred on the intersection 346. This type of steering requires a relatively large space as the rear wheels tend to "cut-off" an arc traced out by the front wheels as the vehicles negotiates the turn, thus requiring more space on the inside of the turn.

Referring to FIG. 9, the axis 19 of the front unit is shown inclined at angle 348 to the axis 20 of the rear unit by articulating about the articulation joint 16 towards the left. Because the tie rod 169 has a fixed length, the wheels 22 and 23 are at the same angles 340 and 341 respectively relative to the front unit as shown in FIG. 8. In other words, there has been no compensation for the swivel angle of the wheels at this stage, which causes the point of intersection 346 of the front wheel axes, shown as 342.1 and 343.1, to move rearwardly to a displaced position shown at 346.1 having swung through an angle 350 from the point 346, which equals the angle 348. With no correction of the swivel angle of the front wheels, scuffing would occur when the vehicle negotiates a curve. In the first embodiment of the invention as shown in FIGS. 1 through 6, this scuffing can be avoided by independently manually adjusting angle of the steering wheel by rotating it clockwise so as to reduce the swivel angles of the front wheels as will be described with reference to FIG. 10. In FIG. 9, it can be seen that radius of the turn, designated 347.1, has been reduced by a spacing 353, which is relatively insignificant.

Referring to FIG. 10, the front and rear units are shown inclined at the angle 348, similarly to FIG. 9, but are provided with the alternative tie rod assembly 287 of FIG. 7 which provides a correction to the swivel angles 340 and 341 of FIG. 9. Thus, the wheels 22 and 23 are shown inclined at corrected swivel angles 356 and 357 respectively in which the angle 356 is less than the angle 340, and the angle 357 is less than the angle 341. In these new positions, axes 342.2 and 343.2 of the wheels 22 and 23 now intersect at an intersection 346.3 which is again located on the projected rear wheel axis 345 and thus should produce negligible scuffing of the wheels during the turn. The new position 346.3 is attained by correcting one or both of the swivel angles 340 or 341 to attain the new swivel angles 357 and/or 356. Thus, both angles 340 and 341 could be corrected by a similar relatively small amount so as to reposition the intersection of the axes 343.2 and 342.2 on the axis 345.

Alternatively, still referring to FIG. 10, one of the wheels could remain at the same inclination as found in FIG. 9, and the other wheel could be corrected through a greater angle so that the axis of the other wheel intersects the intersection of the first wheel and the rear wheel axis 345. In any event, the intersection 346.3 is spaced inwardly from the intersection 346 by a spacing 353 which results in a much smaller radius of turn, designated 347.2. Thus, in some instances the radius of turn of the corrected, two mode steering shown in FIG. 10 is approximately 60–70 per cent of the radius of turn 347 of the normal single mode kingpin steering of FIG. 8. Thus, in FIG. 10, intersection of the axes 342.2 and 343.2 is adjusted to intersect on the axis 345 by changing inclination of either one or both of the front wheels to intersect the axis 345 at a position closely adjacent intersection of one or both of the axes as shown in FIG. 9. This results in a minor correction of at least one of the swivel angles of the front wheels to attain the intersection 346.3, which results in a shorter radius of turn with less wheel scuffing than that shown in FIG. 9. The swivel angle correction is attained automatically by effective "shortening" of the tie rod assembly by use of the bellcrank as shown in FIG. 7. It is noted that the mode of steering of the second embodiment 280 as shown in FIG. 10 cannot be attained manually when operating the first embodiment of FIGS. 1 through 6. In the first embodiment, the operator cannot manually adjust the steering wheel to correct for the effect of the articulation angle on the swivel angles of the front wheel kingpin steering as the tie rod 169 (FIG. 4) has a fixed length. This tends to produce wheel scuffing as described which is also a problem for the prior art vehicle fitted with two mode steering, as previously discussed. In any event, attempting to correct front wheel steering in combination with articulation steering is difficult for a novice operator.

FIG. 10 represents the combination of two modes of steering, namely front wheel kingpin steering in combination with articulation steering, with axes of the rear wheels being stationary with respect to the rear unit. Clearly, both embodiments shown in FIGS. 4 and 7 are capable of rear wheel kingpin steering also, which would provide three modes of steering in which the rear wheels are swivelled with respect to the rear unit as shown in FIG. 5. As shown in FIG. 5, in three mode steering, axes of the rear wheels would intersect the axes of the front wheels and an axis passing through the articulation axis as shown in FIG. 5.

From the above it can be seen that the swivel angle correction is a function of the signal ratio between the first and second outputs of the valves 295 and 296 and the bellcrank assembly, both in FIG. 7. Clearly, the output signal ratio and tie rod shortening effect of the bellcrank assembly must be compatible with each other, to avoid "fighting" or interference between the components. For relatively shallow turns, the adjustment is fairly insignificant, but for relatively tight turns the adjustment becomes fairly significant and the following factors should be considered in designing.

FIG. 11

In the embodiments of FIGS. 4 and 7, the kingpin steering assemblies of the front wheels include transversely extending kingpin steering cylinders 172 and 173 which are located under the vehicle, forward of the front axle, and generally aligned with the respective actuator arms 162 and 166. Because the front cylinders are located in front of the front axle, they are susceptible to damage from tree stumps or boulders that may be obscured from the operator's view.

A third embodiment 361 of the invention re-locates the kingpin steering cylinders of the previous embodiments to a less vulnerable location, and eliminates the requirement for the actuator arms 162 and 166. A vehicle incorporating the third embodiment 361 can be essentially identical to the vehicle 280 of FIG. 7, and thus is not shown fully or described in detail except where there are differences as follows. The third embodiment 361 includes an alternative tie rod assembly 362 which comprises an alternative bellcrank 363 which cooperates with the steering assemblies of the front wheels generally similarly to that as shown in FIG. 7. Thus, the right hand and left hand wheels 22 and 23 have respective tie rod arms 160 and 165 which are coupled to the respective tie rod portions 320 and 321 as shown. The alternative bellcrank 363 has right hand and left hand arms 364 and 365 which are coupled to the inner ends of respective tie rod portions 320 and 321. As before, the bellcrank 363 is journalled for rotation about an axis 367 and serves as a shortening structure to "shorten" the tie rod as the wheels swivel from the straight aligned position.

The alternative steering apparatus further includes right hand and left hand kingpin steering cylinders 370 and which function equivalently to the cylinders 172 and 173 of FIGS. 4 and 7, but cooperate with the wheels through the bellcrank 364. Thus, the steering cylinder 370 extends between the right hand arm 364 of the bellcrank and a suitable portion of the front unit to apply force to the bellcrank to swivel the front wheels. Similarly, the left hand cylinder 371 extends between the left hand arm 365 and the front unit, and thus the cylinders 370 and 371 extend and retract simultaneously working in concert to swivel the front wheels. The cylinders 370 and 371 receive fluid as before from the power steering valve and pump unit 285 which proportions fluid to the cylinders 370 and 371, and also to the articulation steering cylinders 236 and 237 (shown in FIG. 7). Apart from changing the proportion of fluid between the kingpin steering cylinders and the articulation steering cylinders, other aspects of the alternative third embodiment 361 are generally similar to the alternative embodiment 282 of FIG. 7. Clearly, the steering cylinders 370 and 371 can be located within a recess of the front unit and cooperate with the bellcrank in a relatively safe location when compared with the exposed location forward of the front axle as shown in FIG. 7. In this arrangement, it can be seen that the front kingpin steering actuator, which can also be a single linear actuator, or a rotary actuator which cooperates with the tie rod shortening structure of the alternative tie rod assembly 362, i.e. the bellcrank 363, to swivel the front wheels.

Clearly, the fixed relationship between the front wheel swivel angles and the articulation angles of the second and third embodiments 280 and 361 simplify operation of the vehicles, but limit their versatility somewhat as the two steering modes are not independent of each other as in the first embodiment 10.

We claim:

1. A vehicle hydraulic drive apparatus comprising:
   (a) a pressurized hydraulic fluid source having a discharge which discharges pressurized fluid under a relatively high pressure, and a return which scavenges fluid under a relatively low pressure,
   (b) at least one pair of right hand and left hand wheel motors, each motor having a fluid inlet and fluid outlet, each inlet communicating with the discharge of the fluid source when the vehicle is driven forwardly,
   (c) right hand and left hand isolating valves, each valve communicating with the outlet of the respective motor and the return of the pressurized hydraulic fluid source when the vehicle is driven forwardly,
   (d) right hand and left hand flow restrictors, each restrictor communicating with the outlet from the respective motor, and the return of the pressurized fluid source when the vehicle is driven forwardly, and
   (e) a flow combiner having right hand and left hand inlets communicating with the outlets from the right hand and left hand wheel motors respectively, and an outlet communicating with the return of the fluid source when the vehicle is driven forwardly.

2. An apparatus as claimed in claim 1, in which:
   (a) the flow restrictors are in parallel with the flow combiner.

3. An apparatus as claimed in claim 1, in which:
   (a) ratio of maximum flow through one flow restrictor to maximum flow through the flow combiner is approximately 1:10, and (b) the isolating valves when opened have an essentially negligible flow resistance when compared to the flow restrictors.

4. An apparatus as claimed in claim 1, in which:
   (a) the isolating valves are in parallel with the flow combiner and flow restrictors.

5. An apparatus as claimed in claim 4, in which:
   (a) the flow combiner, the isolating valves and the flow restrictors can accommodate reverse flow therethrough.

6. An apparatus as claimed in claim 1, further characterised by:
   (a) a hot oil shuttle valve having a discharge connecting port and a return connecting port communicating with the discharge and return of the hydraulic fluid source, the shuttle valve being responsive to pressure in lines extending from the discharge and return of the fluid source, the shuttle valve having an outlet communicating with a cooler so as to direct fluid at the lowest pressure to the cooler.

7. An apparatus as claimed in claim 1, further comprising:
   (a) an additional pressurized hydraulic fluid source having a discharge which discharges pressurized fluid under a relatively high pressure, and a return which scavenges the fluid under a relatively low pressure,
   (b) at least one additional pair of right hand and left hand wheel motors, each additional wheel motor having a fluid inlet and a fluid outlet, each inlet communicating with the discharge of the additional pressurized fluid source when the vehicle is driven forwardly,
   (c) additional right hand and left hand isolating valves, each additional valve communicating with the outlet of the respective additional motor, and the return of the pressurized fluid source when the vehicle is driven forwardly,
   (d) additional right hand and left hand flow restrictors, each additional flow restrictor communicating with the outlet from the respective additional motor, and the return of the additional pressurized fluid source, and
   (e) an additional flow combiner having right hand and left hand inlets communicating with the outlets from the additional right hand and left hand wheel motors respectively, and an outlet communicating with the return of the additional fluid source when the vehicle is driven forwardly.

8. An apparatus as claimed in claim 7, in which:
   (a) a connecting conduit extends between the two pressurized hydraulic fluid sources.

9. An apparatus as claimed in claim 8, in which:
   (a) the connecting conduit has a fluid restrictor to restrict fluid flow between the two pressurized fluid sources.

* * * * *